United States Patent [19]

Lai et al.

[11] Patent Number: 5,075,845
[45] Date of Patent: Dec. 24, 1991

[54] TYPE MANAGEMENT AND CONTROL IN AN OBJECT ORIENTED MEMORY PROTECTION MECHANISM

[75] Inventors: Konrad K. Lai, Aloha; Frederick J. Pollack, Portland, both of Oreg.

[73] Assignee: Intel Corporation, Santa Clara, Calif.

[21] Appl. No.: 455,635

[22] Filed: Dec. 22, 1989

[51] Int. Cl.⁵ ............................................. G06F 12/14
[52] U.S. Cl. ............................... 395/425; 364/246.6; 364/254.3; 364/957.1; 364/969; 364/DIG. 1; 364/DIG. 2
[58] Field of Search .............................. 364/200, 900

[56] References Cited

U.S. PATENT DOCUMENTS

| 4,315,310 | 2/1982 | Bayless et al. | 364/200 |
| 4,325,120 | 4/1982 | Colley et al. | 364/200 |
| 4,442,484 | 4/1984 | Childs, Jr. et al. | 364/200 |

Primary Examiner—Michael R. Fleming
Assistant Examiner—Glenn A. Auve
Attorney, Agent, or Firm—Owen L. Lamb

[57] ABSTRACT

Access descriptors (24) include an object index (34) for selecting an object in the address space, and a rights field (35) specifying the permissible operations on a bi-paged object (38) selected by the access descriptor. An object table (42) has stored therein object descriptors for use in forming physical addresses to the page table directory object (60) which has page table descriptors stored therein for accessing page tables. A page table (44) has stored therein page table entries for use in forming physical addresses to the paged object (38). Logic compares the page rights field (81) of the page table entry with the rights field (62) of the page table descriptor in the page table directory entry and asserts a fault if the access permitted by the page rights field (50) is inconsistent with the rights field of the access descriptor in the page table directory entry. A mechanism provides for the implicit deallocation of certain objects and to prevent dangling references if access descriptors which point to objects with shorter lifetimes are stored in objects with longer lifetimes. Special Instructions provide a mechanism for the amplification or restriction of the rights of access descriptors.

3 Claims, 4 Drawing Sheets

TYPE MANAGEMENT AND CONTROL IN AN OBJECT ORIENTED MEMORY PROTECTION MECHANISM

CROSS REFERENCE TO RELATED APPLICATIONS

Application Ser. No. 07/455,625 filed Dec. 22, 1989 entitled "Disabling Tag Bit Recognition and Allowing Privileged Operations to Occur in an Object-Oriented Memory Protection Mechanism", assigned to Intel Corporation, the assignee of the present invention.

Application Ser. No. 07/455,626 filed Dec. 22, 1989 entitled "Synchronous Communication Between Execution Environments in a Data Processing System Employing an Object-Oriented Memory Protection Mechanism", assigned to Intel Corporation.

Application Ser. No. 07/455,585 filed Dec. 22, 1989 entitled "Object Lifetime Control in an Object-Oriented Memory Protection Mechanism", assigned to Intel Corporation, the assignee of the present invention.

BACKGROUND OF THE INVENTION

1. Field of the Invention

The invention relates to data processing systems, and more particularly to a memory-accessing system which protects memory locations from unauthorized access.

2. Description of the Related Art

Modern computer systems are organized such that all information within the system is represented by hardware-recognized, memory-resident information structures called objects. This is known as an object-oriented computer architecture. An object is a package of data that is a representation of related information maintained in a contiguously-addressed set of memory locations.

In an object-oriented programming system, each type or class of object has a set of operations that are permitted to be performed on the objects that are members of the class. This is known as an object-based access mechanism. The internal structure of objects is hidden from the programmer. The programmer can manipulate the objects only with the permitted operations. Access to an object is by means of a pointer to the object called an access descriptor. An access descriptor describes the kind of representation (rep) rights (such as read rights or write rights) which define the various kinds of access to the object that are permitted by the holder of the access descriptor for that object.

U.S. Pat. No. 4,325,120 granted Apr. 13, 1982, to Colley et al. and assigned to Intel Corporation, discloses an object-based access mechanism in which two basic types of objects are recognized and distinguished by a processor. The first basic type is a data segment which contains ordinary data. The second basic type is an access list which contains access descriptors which are used to access information, that is other objects, in the memory. Each access descriptor provides information for locating and defining the extent of access to an object associated with that access descriptor. Unauthorized access to the memory is controlled by a protection mechanism which checks the access descriptor utilized in the process of generating references to objects in the memory.

In early computer systems, the architecture provided for two program states, the supervisor state and the problem state, with the processor switching between the two states. In the problem state, all privileged instructions (I/O instructions, protection instructions, and a group of control instructions) are invalid. In the supervisor state, all instructions are valid. When a privileged instruction is encountered in the problem state, a privileged-operation exception is recognized, a program interrupt occurs and the operation is suppressed. Protection is provided to protect the contents of certain areas of main memory from destruction or misuse. Locations are protected by identifying blocks of storage with a key and comparing this key against a protection key supplied with the data to be stored. A mismatch will cause an exception to be recognized, a program interrupt occurs and the operation is suppressed.

The architecture of the Colley et al. patent eliminated the need for different execution states within the processor, such as the supervisor state and the problem state. In that object-oriented architecture there was no need for privileged instructions that are executed only when the processor is in the supervisor state. Memory protection was achieved by allowing or prohibiting access to certain objects, rather than certain memory locations.

In an object-oriented architecture, segments are the basis for all addressing and protection. A segment is a single linear address space with a defined size or length. Segments exist in main memory and are associated with a starting or base address. To determine the actual physical address of an item of data within a segment or an object, one adds the position of the item within the segment (called its displacement) to the segment's base address. In systems with segmented addressing, moving a segment requires the updating of its base address. However, the base address information can be distributed throughout memory and in the processor's registers. This means that if a segment is moved, many copies of its base address will have to be located and updated to reflect the change. To obviate this problem, the Colley et al. architecture brings together all of the information about a segment and places that information in a segment table. It then requires that all references to a segment obtain the necessary base address and length information from this table. Any reference to the segment will access the segment descriptor and obtain the correct and current base address and length information. It is an object of the present invention to provide an object addressing mechanism that will accommodate simple to complex addressing structures with access protection at each level of addressing.

It is an object of the present invention to provide an object type management mechanism which will accommodate both system types, specifying predefined properties of an object, and extended types, specifying type-specific software-defined properties of an object.

It is a further object of the invention to provide a mechanism for the amplification or restriction of the rights of access descriptors.

SUMMARY OF THE INVENTION

Briefly, the above objects are accomplished in accordance with the invention by providing an object table object (42), a page table directory object (60), and a page table object (44). Each of the objects is comprised of words, the words being either access descriptors or data words. Each access descriptor includes an object index for selecting an object in an the address space of the processor's memory, and a rights field specifying the permissible operations on an object selected by the access descriptor. The object table object (42) is stored at an address accessible by the processor upon processor initialization and has stored therein object descriptors for use by the processor in forming physical addresses to the page table directory object (60). Each of the object descriptors includes a first encoded field (52) specifying the base address of the object referenced by the object descriptor and a second encoded field (50) which includes object entry type. The page table (44) has stored therein page table entries for use by the processor in forming physical addresses to the paged object (38) and each page table entry has a page rights field (81). The offset (22) includes a page index (PI) used to index into a selected page table to locate the page table entry, and a page offset (PO) used in conjunction with a base address (79) stored in the page table entry to locate a datum entry in the paged object (38). Protection is accomplished by comparing the page rights field (81) of the page table entry and the rights field (50) of the page table directory entry with the type of memory access. A fault is asserted if the access is inconsistent with the page rights field (62) of the page directory entry or the page rights field (50) of the page table entry.

One of the instruction objects is a rights amplification instruction and a type definition object object (74) is provided. The type definition object has a Super TDO bit. The TDO bit is interpreted during execution of the rights amplification instruction such that when zero (0) the TDO is used to amplify rights of access descriptors for objects whose type matches that type specified by the TDO, (if the extended bit is 1), or whose TDO matches that of the specified TDO. When the TDO bit is set to one (1) the TDO is used to amplify rights of any access descriptor.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein.

DESCRIPTION OF THE PREFERRED EMBODIMENT

The microprocessor in which the present invention may be embodies is shown in more detail in patent application Ser. No. 07/455,625. To summarize briefly, the microprocessor is logically subdivided into the following major units: an Instruction Fetch Unit, an Instruction Decoder and Microinstruction Sequencer, a Translation Lookaside Buffer, a Local Bus Sequencer, and an Integer Execution Unit and Floating Point Unit.

The Translation Lookaside Buffer (TLB) performs the address translation needed to implement virtual memory mechanisms. The address translation and memory protection uses an associative table of storage descriptors and page table entries. The TLB contains an address cache, an address adder, and memory protection checking hardware.

Execution Modes

As described in patent application Ser. No. 07/455,625, the system provides two modes of execution, User mode and Supervisor mode, to support the efficient emulation of conventional operating systems. The system does not define the notion of privileged instructions. All instructions can be executed in either mode. A program gains privilege by nature of its access representation (rep) rights and its execution mode. The page rep rights in the current linear address space are interpreted differently depending on the execution mode. Storage used by the operating system generally has page rep rights which do not allow user access, but may be read-only or read/write in the Supervisor mode.

An instruction (14) in the memory may contain an address (20) which is a virtual memory address to the object (38). The address is stored in a processor register (11) in the processor. The address includes an offset (22) and an access descriptor (24). The access descriptor (24) is a 32-bit word which has a tag bit (33). The access descriptor includes an object index (34) and a rights field (35). The object index provides an offset into an object table (42) which contains storage descriptors for objects stored in the memory, one of the objects being a page table (44). The descriptor includes an encoded field (50) and a base address (52). An object is described by an object table entry in the object table (42) which provides the mapping information for the physical addresses of the storage blocks and pages which together represent the physical objects. For a simple object, the object is represented by a block in physical address space directly. The physical base address (52) is stored in the object table entry. The information within the object is located by using a simple offset in the virtual address.

A paged object is represented by a set of physical pages using a single-level page table. A bi-paged object (38) is represented by a set of physical pages using a page table (44) and a page table directory (60). The object table entry for a paged object, called a paged object descriptor, contains the physical base address (61) of the page table directory (60), which is an array of page table directory entries for the page tables, including page table (44). The page table directory entry is found by indexing using the page table directory index (DI) located in the offset (22). The page table entry is found by indexing using the page index (PI) located in the offset (22). The bi-paged object entry is found by indexing using the page offset (PO) located in the offset (22).

Object Addressing

Three different address spaces are defined, Logical Address Space, Virtual Address Space and Physical Address Space. The Logical Address Space is accessed with a Linear Address which includes an Object Selector and an Object Offset. The Virtual Address Space is accessed with an Object Index and an Object Offset. The Physical Address Space is accessed with an Object/Page Table Entry and Block/Page Offset.

A logical address space is mapped onto a virtual address space which is mapped onto a physical address space. An address in each space has a unique structure as described below.

Physical Address Space

The physical address space covers read-write memory, read-only memory, and memory-mapped I/O. Communication with the physical world is in terms of physical addresses. The physical address space is byte addressable and must guarantee atomic and indivisible access (read or write) for memory addresses that are aligned according to the size of the access, i.e. a word access must be aligned to a word boundary. An indivisible access guarantees that a processor reading or writing a set of memory locations will complete the operation before another processor can read or write the same location. An atomic operation allows a processor to read and modify a set of memory locations with the guarantee that another processor doing an atomic operation on the same block will be delayed.

Virtual Address Space

The virtual address space is a collection of independent address spaces called objects. Any datum within an object is located by a simple offset. The virtual address of the datum is specified by two components: an object index that selects the desired address space and an object offset that selects the datum within the address space. The size of the virtual address space is the product of the number of objects allowed and the maximum size of each object.

An object is also defined as the unit of protection. To control access within the virtual address space, the system protects and restricts the generation of object indices. An access descriptor (AD), is defined to contain an object index. The system protects the AD pointer by not allowing ordinary data to be used to represent it. An access descriptor (AD) can point to any of the objects in the virtual address space. The virtual address is, therefore, specified by a protected object index (i.e. an access descriptor) and an unprotected offset into the object.

Logical Address Space

Access descriptors, directly or indirectly accessible, are conceptually assembled in sets to form yet a third type of address space called a logical (or instantaneous) address space. The logical address space defines the visibility of the execution environment. Logical addresses are mapped onto the single virtual address space. For maximum flexibility, two types of logical addresses are defined: linear address and structured address.

The first type, the linear address, is defined by four objects that form the execution environment. A linear address is used to represent the conventional notion of a process address space. Linear addresses, interpreted within a given environment, are mapped onto the virtual address space. The mapping of linear addresses to virtual addresses is a fundamental part of the instruction interpretation process. In a linear address, an operand specifier supplies only an off-set; the current linear address space is implied. The upper two bits of a linear address implicitly selects one of the four objects that define the execution environment, while the remaining 30 bits is an offset into the selected object.

The second type, the structured address, is defined by a virtual address (i.e. access descriptor plus offset). The structured address is used to invoke advanced object-oriented protection features. In a structured address, an operand specifier supplies a virtual address. Since the system does not allow specifying an AD directly in the instruction stream, the AD part of the virtual address must be specified indirectly using an AD selector in an operand specifier within the instruction. An AD selector specifies an AD stored locally in the processor registers. This limits the instantaneous addressability of objects to those accessible by the ADs in the processor registers only.

Access Descriptors and Their Rights

An access descriptor (AD) is a protected pointer to an object in the address space. The system protects access descriptors from accidental or malicious creation and modification.

A program cannot address an object directly, but only indirectly via an access descriptor in the execution environment. Since a program cannot reference an object without an access descriptor to it, a program's visibility can be restricted to only those objects it needs to access.

An access descriptor contains the following information: Object Index, Rights, and Lifetime bit. The Object Index selects the object. The rights specify read rights, write rights and type rights in an AD. The rights indicate the permissible operations on the object. Rights are associated with an access descriptor and not with the object itself. It is thus possible to have different rights to the same object by selecting different access descriptors. The Lifetime bit indicates the lifetime of the object that an AD references.

AD to Object Mapping

Objects are referenced using access descriptors which are system-wide protected pointers. The object index (34) in an access descriptor selects an object table entry (OTE) in the system wide object table object (42). An object table entry specifies the location, size, type, etc. of the referenced object.

Storage Blocks and Pages

An object is physically composed of a storage block and/or a set of pages. A block is a contiguous area in the physical address space. A block can be used to represent a simple object, a page table, or a page table directory.

The base address of a storage block points to the first visible byte of the block. The base address of a storage block must be aligned on a 64-byte physical address boundary. The length of a block varies from 64 bytes to 4096 bytes. A block cannot span across a 4K byte boundary.

An object can also be represented by a set of pages with one or two level(s) of page tables. The first level table can be a storage block instead of a page. The pages that define the bi-paged object (38) are described by the page table (44). A page is a fixed size block of 4K bytes with base address aligned on a 4K-byte boundary.

Tagging

An object may contain access descriptors and/or data, i.e. any binary information. Access descriptors and data can reside in the same object and can be interleaved in any arbitrary order. In some systems, a tag bit is associated with each 4-byte aligned word in memory to indicate whether the word is data or possibly a valid access descriptor. A valid access descriptor must be aligned to a 4-byte boundary with a its tag bit set to one. A tag bit of zero is used to indicate that the word contains data or an access descriptor that cannot be dereferenced, that is cannot be used to reference the contents of an object.

In some systems, the tag bit is not available. In such systems, the interpretation of a word as data or an access descriptor depends upon the operation.

In a word-aligned read or write of the whole word, the tag bit is either preserved or set to zero depending on the operation. In an non-word aligned read, or a partial read of a word, the tag bit of the returned value is always forced to zero. The data manipulation (arithmetic or logical) instructions generate results with tag bits force to zero, independently of the tag bits of the source operands. Tagging is described more fully in patent application Ser. No. 07/455,625.

Typed Objects

The internal organization of certain objects is defined by specifying and interpreting data structures within their address spaces. These objects play a key role in the protection system, the interprocess/interprocessor communication system, and the storage management system. To recognize these system-defined objects and to control their use, each one may be identified by a code. The code is called the object type and it is maintained with the object's address mapping information. The present invention allows users to invent their own object types and to assign them unique type codes.

Object Offset

An object offset is a 32-bit ordinal used to specify a datum within an object. It is capable of pointing to either data or access descriptors in an object. An object offset is divided into a number of fields. The interpretation of these fields is dependent on the object representation.

Object Size

The size of an object is specified in encoded fields (50) of the object table entry (OTE). The object offset (22) in a virtual address (20) plus the operand size is compared with the size of the referenced object on every address translation. This operation is called bounds checking and prevents reference beyond the specified object of a datum which may belong to another object.

Object Representation

An object is described by the object table entry which provides the mapping information for the physical addresses of the storage blocks and pages which together, directly or indirectly, represent the physical object. The system uses three different mapping schemes for different maximum object sizes and to minimize object representation overheads.

Simple Objects

A simple object is represented by a block in physical address space directly. The physical base address is stored directly in the object table entry. Such an entry is called a simple object descriptor.

Paged Objects

A paged object is represented by a set of physical pages using a single-level page table. The object table entry for a paged object, called a paged object descriptor, contains the physical address of a page table, which is an array of page table entries for the pages.

Bipaged Objects

Figure 1:
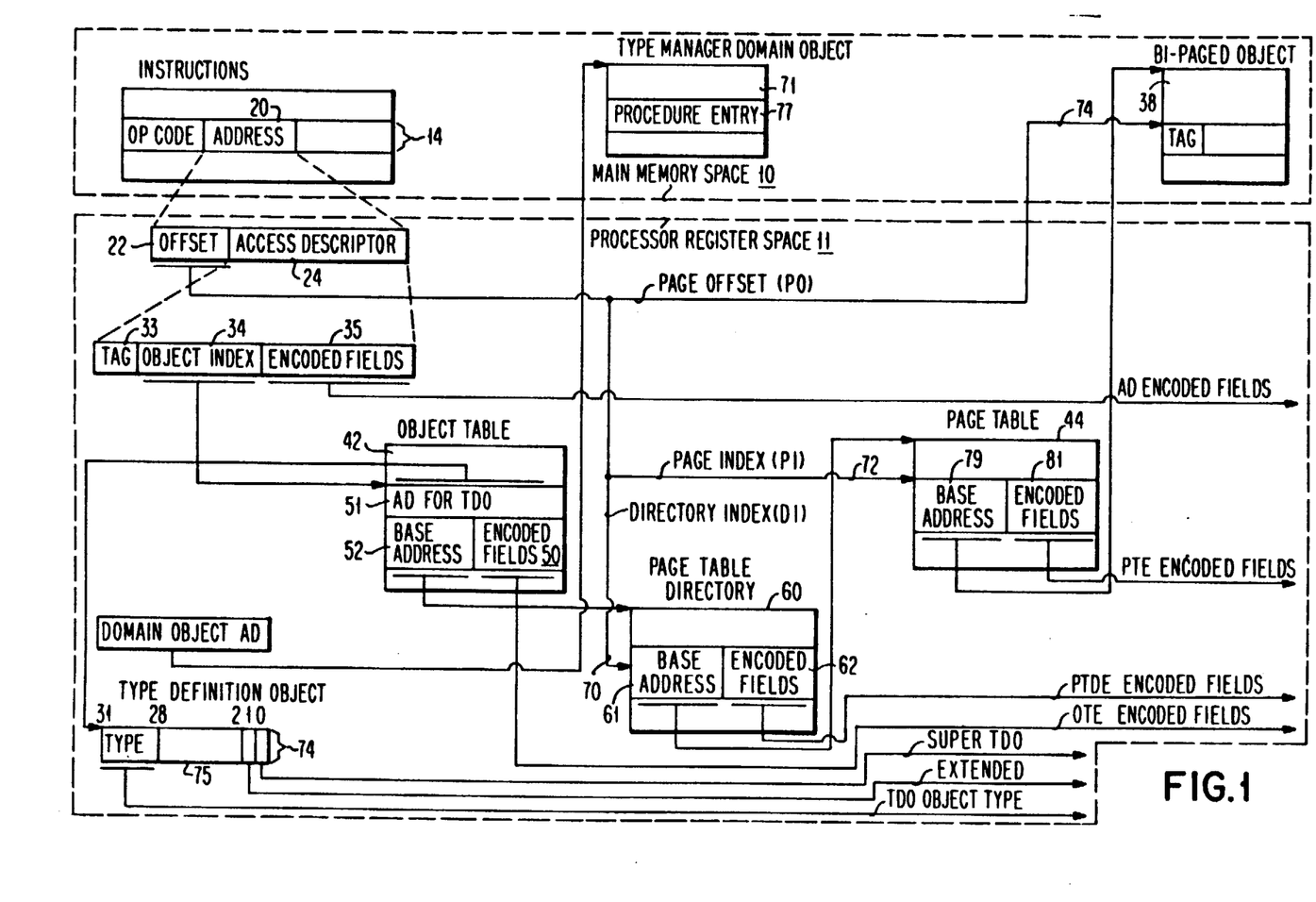
FIG. 1 is a block diagram of the processor registers and of system objects for supporting object addressing and protection.
Figure 2:
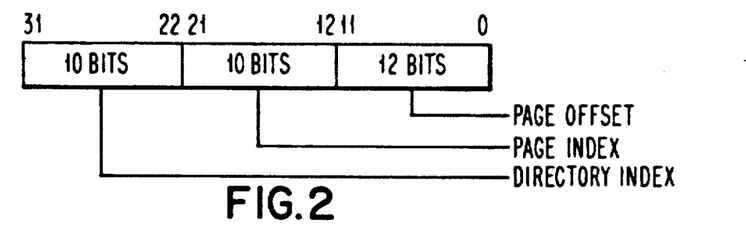
FIG. 2 is a more detailed block diagram of the object off-set of FIG. 1.

A bipaged object is represented by a set of physical pages using two levels of page tables. As shown in FIG. 1, the object table entry for a bipaged object, called a bipaged object descriptor, contains the physical address of a page table directory (60), which is an array of page table entries for page tables, including the page table (44) shown.

A simple object is defined by a simple object descriptor and represented by a single block. A simple object descriptor contains the physical base address and the block length. A simple object cannot span across a 4K byte physical address boundary.

A simple object offset is partitioned as follows:

Directory Index DI (bits 22-31)

This 10-bit field must be zero. Otherwise a PROTECTION fault is raised.

Page Index PI (bits 12-21)

This 10-bit field must be zero. Otherwise a PROTECTION fault is raised.

Block Offset SO (bits 0-11)

This 12-bit field is the byte displacement added to the base address of the block to form the physical address for the first byte of the operand.

Paged Objects

A paged object is described by an object table entry called a paged-object descriptor. Paged objects are implemented with one level of page table. Each page is individually swappable and relocatable, thus not all pages of a paged object need be present in physical address space at the same time. To access an item of a paged object, only the page table and the selected page need to be located in the physical address space.

A paged-object descriptor contains the object length, but does not contain the base addresses (45) of the pages which represent the object. The base address field (45) of a paged-object descriptor contains the base address of the page table block. The length of the page table block is defined by the object length of the object.

A paged object offset (22) is partitioned as follows:

Directory Index, DI (bits 22-31)

This 10-bit field must be zero. Otherwise, a PROTECTION fault is raised.

Page Index, PI (bits 12-21)

This 10-bit field is used to index into the selected page table (44) for a page table entry.

Page Offset, PO (bits 0-11)

This 12-bit field is the byte displacement and is appended to the base address (45) in the page table entry of the page to form the physical address for the first byte of the operand in the paged object (38).

Bipaged Objects

Refer to FIG. 1. A bipaged object (38) is described by an object table entry (50, 52) called a bipaged object descriptor. Bipaged objects are implemented with two levels of page tables. Each page or page table is individually swappable and relocatable, thus not all pages or page tables of a bipaged object need be present in physical address space at the same time. To access an item of a bipaged object, only the page table, the selected page table, and the selected page need to be located in the physical address space.

A bipaged object descriptor contains the object length, but does not contain the base addresses of the pages nor page tables which represent the object. The base address field (52) of a bipaged object descriptor contains the base address of the page table directory block (60). The length of the page table directory block is defined by the object length of the object.

A bipaged object offset is partitioned as follows:

Directory Index, DI (bits 22-31)

The directory index (70) selects a page table entry in the page table directory specified by the bipaged object descriptor.

Page Index, PI (bits 12-21)

The page index (72) selects a page table entry in the specified page table.

Page Offset, PO (bits 11-0)

The page offset (74) is used as an offset into the page. The page offset is appended to the base address (in a page table entry) to form the physical address for the first byte of the operand.

Object Lifetime

To support the implicit deallocation of certain objects and to prevent dangling references, the system defines the concept of object lifetime. Dangling references can only occur if access descriptors which point to objects with shorter lifetimes are stored in objects with longer lifetimes. The local object lifetime bit in the encoded fields portion of access descriptors, object descriptors, and page table entries are the means by which the system determines the lifetime of an object and prevents a potential dangling-reference access descriptor from being stored.

Local Bits

A local bit is associated with each object to denote its relative lifetime. The local bit is located in the encoded fields portion of the object descriptor for the object, for example in the encoded fields (50) of the storage descriptor in the object table (42). A value of 0 indicates a global object with unbound object lifetime. A value of 1 indicates a local object with bound object lifetime.

Lifetime Checking

Figure 7:
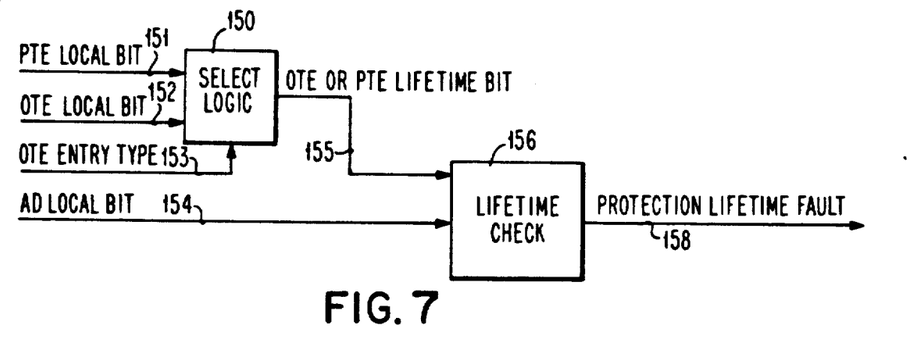
FIG. 7 is a diagram of lifetime protection checking logic.

Refer to FIG. 7. The object lifetime check is performed every time an AD is stored. Since this requires the lifetime of the source AD and destination location to be compared, the operation is called lifetime checking. If a valid source AD has its associated local bit set to 1 and the lifetime of the destination location (in an object table entry or a page table entry) has its associated local bit set to 0 (is of global lifetime), a PROTECTION.LIFETIME fault is signalled. The destination location(s) may be modified if there is no other protection fault, but the AD of local lifetime must never be stored in the destination.

In FIG. 7, the AD local bit in the encoded fields (35) of AD (24) is compared in OTE Lifetime Check Logic (150) with the destination object lifetime, the OTE local bit in the encoded fields (50) of the OTE access descriptor. The OTE local bit in the encoded fields (50) of the OTE is compared in PDTE Lifetime Check Logic (152) with the destination object lifetime, the PDTE local bit in the encoded fields (62) of the PDTE access descriptor. The PDTE local bit in the encoded fields (62) of the PDTE is compared in PTE Lifetime Check Logic (154) with the destination object lifetime, the PTE local bit in the encoded fields (62) of the PTE access descriptor. If any of these checks fails, a protection lifetime fault (158) occurs at the output of the OR (156).

In the implicit manipulation of system objects, lifetime checking is ignored unless explicitly specified.

When an access descriptor is stored into memory, lifetime checking is performed first. When an access descriptor is written into memory, lifetime checking is not performed.

Mapping Tables

Object Table Objects

An object table object (42) serves as the root of the virtual address mapping. An object index field (34) in the object table entires. The object index field (34) in the access descriptor (24) selects an object table entry in the object table (42). Object table entries are described subsequently.

Object tables do not have a system defined system type. Although an AD that is a pointer to an object table OT has global lifetime, the object table entries (OTEs) or page table entries of an object table (OT) must have local lifetime. This is necessary to support Type Definition Object (TDO) ADs in OTEs and embedded descriptors.

There is one system wide object table (OT) for all processors which share a single system wide virtual address space.

System Defined Object Indices

The following object indices are defined:

| Object Indices | Purpose |
| --- | --- |
| 0 | Reserved for empty AD. |
| 1-7 | Preserved |
| 8 | Object Table |
| 9-15 | Preserved |
| 16-31 | Default TDO ADs for object types 0-15 |

Page Tables or Page Table Directories

Page tables (44) are used to provide one or two level(s) of mapping for paged objects and bipaged objects. Page table directories (60) are used to provide the first level of mapping for bipaged objects. Page tables (or page table directories) contain page table entries (or page table directory entries) which define the base address of a page, and other information for virtual memory management and garbage collection.

Page tables and page table directories are system recognized, but are not objects and do not have a system type.

A page table (44) is an array of page table entries, each of which is 4 bytes in length. Each page table entry in a page table describes a page in a paged object or a bipaged object. Each page table entry in a page table directory (60) describes a page table (44) for a bipaged object (38).

The page table of a paged object or the page table directory of a bipaged object can be variable in size and aligned on any 64-byte boundary. The page tables of a bipaged object must be 4K bytes in size and aligned on 4K bytes boundary.

Page tables and page table directory are not objects and thus cannot be accessed directly in the virtual address space. In one embodiment of the invention they are accessed using physical addresses. In another embodiment of the invention the page tables are mapped to part of the object they are defining. In the second approach, the physical address of the page table directory or the page table is duplicated. Software guarantees that the physical address alias is updated during page swapping.

Descriptor Formats

Data Words

The fields of a data word are defined as follows:

Data (bits 0–31)

This field contains any data value.

Tag (Tag Bit)

This bit is 0 for data values.

Access Descriptors Access Descriptor

Figure 3:
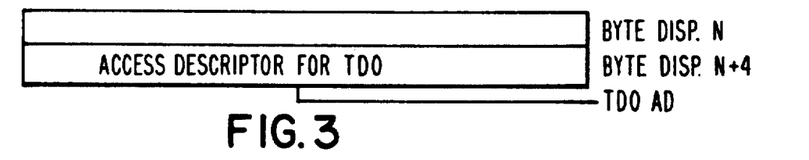
FIG. 3 and FIG. 4 together comprise a diagram of a storage descriptor within the object table of FIG. 1.

The diagram of FIG. 3 includes an access descriptor. The fields of an access descriptor are defined as follows:

Read Rights (bit 0)

This bit indicates that reading the contents of the object referenced by this access descriptor is allowed.

Write Rights (bit 1)

This bit indicates that writing the contents of the object referenced by this access descriptor is allowed.

Type Rights (bits 2–4)

The interpretation of this 3-bit field is determined by the object type of the referenced object.

| Name of the bit | bit position in the AD |
|---|---|
| Type Rights 1 | bit 2 |
| Type Rights 2 | bit 3 |
| Type Rights 3 | bit 4 |

Local (bit 5)

This bit indicates the object's lifetime. This bit is a 0 for a global object and 1 for a local object.

Object Index (bits 6–31)

This 26-bit field selects an object table entry in the object table.

Tag (Tag Bit)

This bit must be 1 for a valid access descriptor.

Mixed Words

A mixed word is the union of a data word and an access descriptor, i.e. a mixed word can be viewed as either a data word or an access descriptor depending on the context.

The values of a mixed word are divided into the following classes:

(1) Valid Access Descriptor

A valid access descriptor has the tag bit set to 1. This can be dereferenced (used to reference the content of the object) if the object for the corresponding index is defined. The CONSTRAINT.INVALID_AD fault is raised when the tag bit is 0 when an AD is expected.

(2) Data

A data word has the tag bit set to zero. When a data value is generated, the tag bit is always set to zero. When a data value is expected, the tag bit is ignored and interpreted as zero. No fault is raised when the tag bit is 1 when a data value is expected.

Virtual Addresses

FIG. 3 is a diagram of a virtual address format. The fields of a virtual address are defined as follows:

Object Offset (bytes 0–3)

This 32-bit field contains an Ordinal offset into the object referenced by the access descriptor in the virtual address.

Access Descriptor (bytes 4–7)

This AD specifies the object referenced by this virtual address. The AD also specifies the permissible operations using this virtual address.

Object Table Entries

Figure 4:
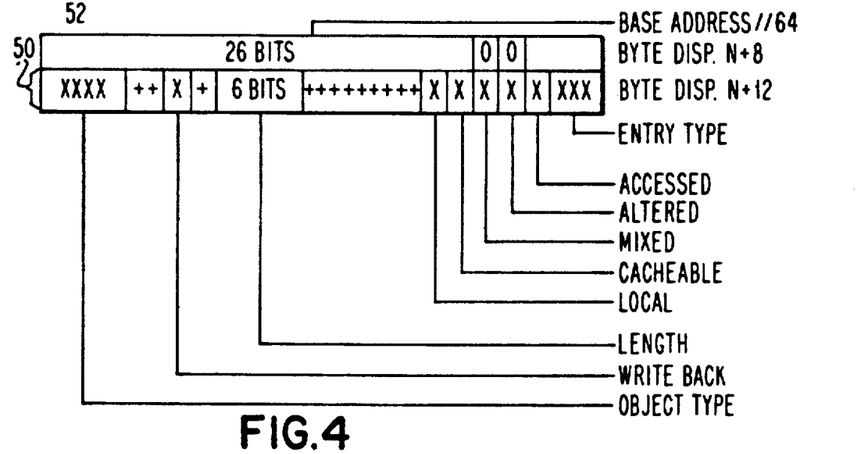
Figure 5:
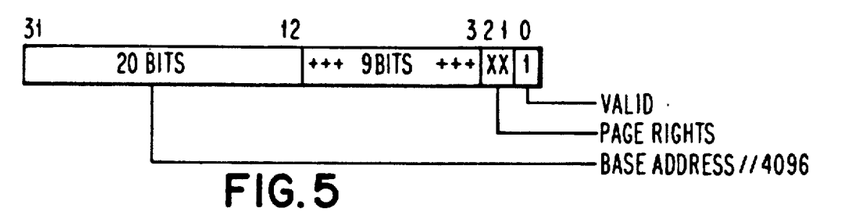
FIG. 5 is a diagram of the page table directory entry (PTDE) within the page table directory FIG. 1; and, FIG. 6 is a diagram of the page table entry (PTE) within the page table FIG. 1.
Figure 6:
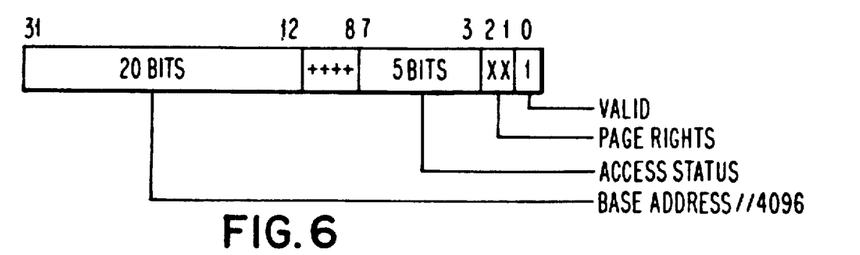

An object table (42) can contain the following types of object table entries. All object table entries are 16 bytes in size. Specific object table entries are identified by the entry type field (bits 96–98) of each object table entry as follows:

000—Invalid Object Table Entry
001—Embedded Descriptor
010—Invalid Simple Object Descriptor
011—Simple Object Descriptor
100—Invalid Paged Object Descriptor
101—Paged Object Descriptor
110—Invalid Bipaged Object Descriptor
111—Bipaged Object Descriptor The last six object table entries are collectively called storage descriptors. The format of a storage descriptor is shown in FIG. 4. Valid storage descriptors contain physical addresses. Invalid storage descriptors, where the base address field may not be valid, are used to indicate that the selected object cannot be accessed.

The fields of a invalid simple object descriptor, a invalid paged object descriptor, or a invalid bipaged object descriptor are defined as follows:

TDO AD (bits 32–63)

This field (51) contains the type definition object AD associated with this object descriptor.

Reserved (bits 68–69)

This field must be zero.

Base Address (bits 70-95)

This 26-bit field (52) contains the physical base address (in units of 64 bytes) of the block, page table or page table directory. This provides a 2**32 byte physical address space. This field is uninterpreted in an invalid storage descriptor.

Entry Type (bits 96-98)

This 3-bit field indicates the type of object table entries and the definition of the rest of the descriptor.

Access Status (bits 99-103)

This 5-bit field is described in the next section. This field is only defined in a simple object descriptor. This field is preserved for other entry types.

Object Length (bits 114-119)

This field contains the (encoded) length in units of 64 bytes of the storage block referenced by the base address field.

The word "encoded" is used with a length field to indicate that the field contains the actual length minus one instead of the actual length.

In a simple object, this field contains the (encoded) length in units of 64 bytes defined by this descriptor.

In a paged object descriptor, this field contains the (encoded) length in units of 64K bytes, or the number of page table entries in the page table (minus one)/16 defined by this descriptor.

In a bipaged object descriptor, this field contains the (encoded) length in units of 64M bytes, or the number of page table entries in the page table directory (minus one)/16 defined by this descriptor.

Write Back (bit 122)

This bit enables write-back caching for the object if the segment or page is cacheable.

Object Type (bits 124-127)

This 4-bit field encodes the object type of the object.

Access Status

The access status field contains information for the management of blocks and pages. It is found in simple object descriptors and valid page table entries (PTEs). This field does not appear in an invalid object descriptor, a paged/bipaged object descriptor, nor a page table directory entry (PTDE).

The 5 bits of the access status field shown in FIG. 4 are defined as follows:

Accessed (bit 99 in OTE, Bit 3 in PTE). This bit indicates the object or page defined with this descriptor has been referenced (read or write). This bit is ensured to be 1 before the associated storage is referenced. This bit is sticky (i.e. it is set implicitly by the system but never cleared).

Altered (bit 100 in OTE, Bit 4 in PTE). This bit indicates the object or page defined with this descriptor has been overwritten. This bit is ensured to be 1 before the associated storage is overwritten. This bit is sticky (i.e. it is set implicitly by the system but never cleared).

Mixed (bit 101 in OTE, bit 5 in PTE or PTDE). This bit indicates that an AD has been written in the object or page defined by this descriptor. This bit is ensured to be 1 before the associated storage is overwritten with a non-zero tag bit. This bit is sticky (i.e. it is set implicitly by the system but never cleared).

Cacheable (bit 102 in OTE, Bit 6 in PTE). This bit indicates the object or page defined with this descriptor can be cached. The encodings of the cacheable bit are as follows:

0—Do Not Cache
1—Can Be Cached.

Local (bit 103 in OTE, bit 7 in PTE). This bit indicates the lifetime of the object or page defined by this descriptor. This is 0 for a global object or page and 1 for a local object or page.

It may be necessary to set the accessed, altered, or mixed bits of the OTE/PTE in memory to ones on a memory access. The operation is performed using an atomic operation. The cacheability and local bits are never modified. It is permissible to alter these bits even though the OTE/PTE returned by the atomic read is invalid as long as the OTE/PTE is valid on a previous read and a TLB invalidation operation has not been performed o the specific OTE/PTE.

When an OTE/PTE is invalidated by software, only the valid bit should be modified first because the accessed, altered and mixed bits may be modified at the sam time.

When the accessed, altered and mixed bits are updated in memory using RMW operations, the valid bit of the original OTE/PTE must not be altered.

Embedded Descriptors

Embedded Object Descriptor

An embedded descriptor holds special system-defined data structures. The only such data structure defined by the system is a semaphore.

The fields of an embedded descriptor are defined as follows:

Storage Area (bits 0-95)

This 12-byte area is used to represent the data structure.

Entry Type (bits 96-98)

This field is 2#001# for an embedded descriptor.

Use Default TDO (bit 99)

If set, this descriptor has an associated default TDO. If clear, the TDO AD is assumed to be in bits 32-63 of the descriptor. (software would normally set this bit in an embedded descriptor.)

Type (bits 124-127)

The only value defined by the system is 0100, which in that the first three words hold a semaphore.

Invalid Object Table Entry

The fields of an invalid object table entry are defined as follows:

TDO AD (bits 32-63)

This field has the same interpretation as in a storage descriptor, but only if flag use-default-TDO is clear.

Entry Type (bits 96-98)

This field is 2#000# for an invalid object table entry.

Use Default TDO (bit 99)

If set, this descriptor has an associated default TDO. If clear, the TDO AD is assumed to be in bits 32-63 of the descriptor.

Object Type (bits 124-127)

This field has the same interpretation as in a storage descriptor.

Page Table Entries

A page table or page table directory contains an array of 4-byte page table directory entries of similar format. Page table entries in a page table directory specify page tables while page table entries in a page table specify pages The fields of a valid page table entry (PTE) or page table directory entry (PTDE) are defined as follows:

Valid (bit 0)

This bit is 1 to indicate a valid page table entry or page table directory entry.

Page Rights (bits 1-2)

This 2-bit field encodes the permissible operations (read or write) in different execution modes on the contents of this page (in a page table entry) or for the pages by this page table (in a page table directory entry). Since a page may be controlled by more than one set of page rights, the effective rights is minimum of all page rights.

Access Status (bits 3-7)

This 5-bit field is similar to that in a storage descriptor. This field is defined for a page table entry and is preserved for a page table directory entry.

Base Address (bits 12-31)

This 20-bit field contains the physical base address (in units pages of 4096 bytes) of the page.

The field of an invalid page table directory entry is defined as follows:

Valid (bit 0)

This bit is 0 to indicates an invalid page table directory entry.

Virtual Address Translation

For a memory request, an instruction specifies an Access Descriptor, an Object Offset, whether it is a Read or a Write access, and the Length of the Request.

The following describes the address translation of a virtual address to a physical address for accessing a paged object:

(1) Compute the last byte of the memory request by adding the request length to the object offset.

(2) Perform the request as two separate memory requests.

(3) Determine the rep rights needed by the request type.

(4) Raise a PROTECTION fault if the rights needed are not presented in the read and write rights of the AD.

(5) Read the object table entry selected by the object index of the access descriptor. The entry type and valid bit are found in the encoded fields of the object table entry. Raise a DESCRIPTOR fault if the entry type is not appropriate. Raise a VIRTUAL MEMORY fault if the object table entry is not a valid storage descriptor.

(6) For this description it assumed that the object table entry is for a paged object. Raise a PROTECTION fault if the directory index and page index found in the offset portion of the address of the memory request is greater than the object length in the paged object descriptor found in the page table.

(7) Scale the page index (bits 12-21 of the offset in the address) by 4 and add it to the base address in the object descriptor (in the object table) to form the physical address of the selected data page table entry (in the page table).

(8) Read the page table entry and raise a VIRTUAL_MEMORY fault if the page table entry is marked as invalid.

(9) Raise a RIGHTS PROTECTION fault if the access descriptor rights are greater than the page rights.

(10) Combine the page offset (bits 0-11 of the address off-set field) with the base address in the page table entry in the page table to form the physical address of the paged object referenced by the memory request.

Object Reference Testing

COMPARE_MIXED and CHECK_TAG

The COMPARE_MIXED instruction compares both ADs or data for equality. If both operands are ADs, the instruction tests whether they reference the same object. If both operands are data, the instruction test whether the data value are equal. The CHECK_TAG instruction checks for the tag bit.

In an untagged system in supervisor mode, the tag bit is assumed to be set in COMPARE_MIXED.

In the Ada expression "access_type_variable=null" where AD is used to represent access variable, the CHECK_TAG should be used instead of the COMPARE_MIXED with zero because any non-zero data values still cannot be used to reference an object.

Access Descriptor Creation

The protection system requires that the tag bit not be set to one arbitrarily, that lifetime checking not be by-passed, and that the mutator operation not be ignored. However, in certain controlled situations, system software needs to create an access descriptor (AD) for an existing object. This is accomplished by the CREATE_ACCESS_DESCRIPTOR instruction.

The CREATE_ACCESS_DESCRIPTOR instruction converts a data word to an AD.

Object Addressing Instructions

LOAD_PHYSICAL_ADDRESS

The LOAD_PHYSICAL_ADDRESS instruction returns the physical address of the operand.

Type Management and Access Control

Typed Objects

The present invention provides two typing mechanisms: system-type and extended-type. They are not mutually exclusive. System types can be viewed as predefined properties of the object, while the extended type provides an unique identifier of the type and allows for type-specific software defined functions. The system-type mechanism is to provide system type specific instructions, which require operands of specific system types. The extended-type mechanism supports user defined types. This allows software defined type specific operations and extended-typed specific operations to verify an object's type before carrying out their prescribed functions. This facility supports the type-manager style of programming.

The type definition object (74) normally contains a reference (75) to a type manager domain object (71) that provides some type-specific procedures.

Object Type Field

The system type of an object is specified by the object type field in its object descriptor (see application Ser. No. 07/455,625. One of the system types is generic (i.e. a simple flat address space) which contains no architecture defined fields.

The encodings for the Object Type field are as follows:

| Encoding (Binary) | Object Type |
|---|---|
| 0000 | Generic |
| 0001 | Type Definition Object |
| 0010 | Process Object |
| 0011 | Domain Object |
| 0100 | reserved |
| 0101 | Port Object |
| 0110-0111 | reserved |
| 1000-1111 | available for system software |

The architecture defines one type value for an embedded descriptor: 0100, which denotes a semaphore.

Type Definition Object (TDO)

Refer to FIG. 1. The extended type of an object (38) is specified by the type definition object's access descriptor (51) associated with the object descriptor in the object table (42), either explicitly or via default. If a default type definition object (TDO) is to be used, the object index for the default TDO is 16 plus the type encoding of the object or embedded descriptor. For instance, for a semaphore, the default TDO is entry 20 in the object table.

A type definition object contains a reference address (75) to the type manager domain (71). The type manager domain (71) contains other information used to manage the instances of a particular object type. These type manager domains reference software defined, type specific operations, that are programmed as procedures (77) or, in some cases, as independent processes.

The object index of the TDO AD (51) can also be used as an unique identifier for the extended type. In this manner, up to 2**26 (64 mega−) extended types can be defined.

For system objects, while the object type is used to indicate the set of type specific instructions, the type definition object can be used to provide software (i.e. procedural) extensions to the architecture-defined, type specific operations.

Different type definition objects may be associated with different instances of the same system object type. This permits software extensions to the architecture defined instructions to be defined on a per instance basis.

LOAD_TYPE_DEFINITION

This instruction copies the type definition object AD associated with the object referenced by the source AD into the destination. If the object specified has a default TDO, an AD (with no type nor rep rights and specifying global lifetime) to the default TDO is returned.

Rights

The architecture uses various rights bits to restrict the way in which an object or an AD may be manipulated. There are two sets of rights bits—one set is found in an AD and the other set is located in the various page table entries in the access (i.e. address translation) path.

Different ADs can have different access rights to the same object. Rights on an access path are shared among all users of the access path. An AD can be easily duplicated with the same or less rights than the source AD. Since an access path cannot be similarly duplicated, the architecture makes any change to rights in the access path affect all users of the access path.

An AD contains the following rights bits:
Type Rights
Read Rights
Write Rights

A page table entry in an access path contains the following rights bits:
Page Rights

Type Rights

The type rights of an AD define the permissible type-specific operations for the object referenced by the AD. The interpretation of the type rights bits of an AD depends on the type of object referenced. The type rights bits for a generic object are uninterpreted. The interpretation of the type rights bits for each system object are predefined. They are described in the individual system object descriptions throughout this specification. The uninterpreted type rights bits are preserved for software defined type rights and interpreted by individual software level type managers.

Read and Write Rights in Access Descriptors

The read rights control reading the content of the referenced object, while the write rights control writing. The actual permissible operations are also optionally determined by the page rights in page tables. This allows the support of inaccessible objects (i.e. no access for encapsulated objects), read-only objects, write-only objects, and read-writeable objects.

Execute rights are not defined; only read rights are required to execute an instruction in the execution environment.

Page Rights

The page rights in a valid page table entry define the read/write rights of the page in a bipaged object or a paged object. Page rights are used to permit software defined areas or regions of the execution environment to have different access protection.

Page rights are interpreted differently depending on the execution mode of the current process and the PTE break mode of the processor. Page rights are defined as follows for the supervisor and user execution modes:

| PTE Break | User Mode | Supervisor Mode |
|---|---|---|
| 1 | 00 - read-write | read-write (break on write) |
| 0 | 00 - no access | read-only |
| X | 01 - no access | read-write |
| X | 10 - read-only | read-write |
| X | 11 - read-write | read-write |

Page rights, instead of AD read/write rights, are used to protect the instruction areas of a linear address space from accidental modification.

When the processor is in physical-addressing mode (address translation is disabled), rights checking is disabled.

As described above, the access rights for an item are defined by rights fields in each level of the access path. Each access path contains the following:

Read and write rights in an AD.

Page rights in the page table directory entry for a bipaged object.

Page rights in the page table entry for a paged object or a bipaged object.

The effective rights for an object address are the minimum of the rights in the access path.

INSPECT_ACCESS

The INSPECT_ACCESS instruction returns the effective page rights of the access path specified by the source address.

Type Definition Object

A type definition object (74) is used to control access rights amplification. A type definition object has a predefined system type.

The type rights in an AD (51) for a type definition object are defined as follows:

Type Right 1: Uninterpreted.

Type Right 2: Amplify Rights: If the bit is 1, the TDO may be used in the AMPLIFY_RIGHTS instruction.

Type Right 3: Create Rights: If the bit is 1, the TDO may be used in the CREATE_ACCESS_DESCRIPTOR instruction.

The fields of the type definition object (74) shown in FIG. 1 are defined as follows:

Super TDO (bit 0)

This bit is interpreted during rights amplification as follows:

0—This TDO can be used to amplify ADs for objects whose type matches that specified by this TDO.

1—This TDO can be used to amplify any AD.

Extended (bit 1)

This bit is 1 if the TDO is used to manage objects having this object as their TDO ADs. This bit is 0 if the TDO is used to manage objects having the same object type as specified in the TDO.

This bit also allows a single TDO, to manage object of the specified object type independent of their TDO ADs.

Object Type (bits 28-31)

This 4-bit field is defined to have the same format as the corresponding field in an object descriptor In the AMPLIFY_RIGHTS instruction, this field is compared against the object type of the referenced object if the extended type and the super TDO bits are zero.

Rights Manipulation

Figure 8:
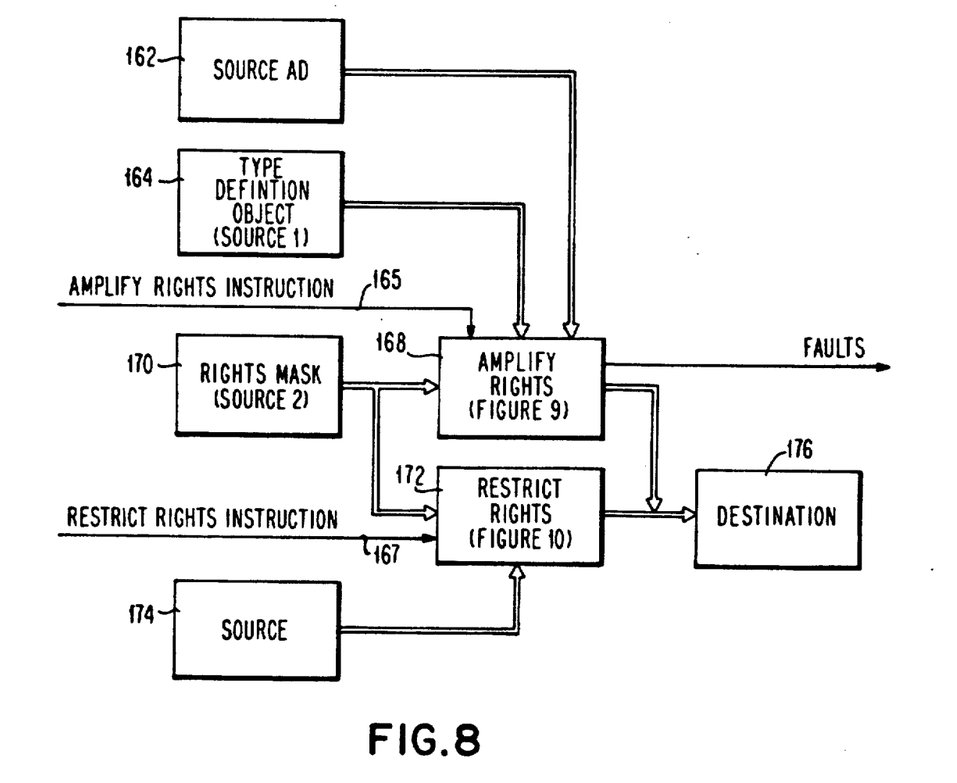
FIG. 8 is a diagram of the execution logic of an amplify_rights instruction and a restrict_rights instruction.

Refer to FIG. 8. Two instructions are defined to increase or decrease the access rights of an AD. A rights mask (170) is specified in the source_2 operand of the instruction during rights amplification and restriction. A rights mask has the same format as an access descriptor, except that the local bit, the object index field and the tag bit are not used.

If the AMPLIFY_RIGHTS instruction (165) is decoded, access rights are amplified by logically-ORing, in the amplify rights logic (168), the access rights in the source AD (162) with those in the rights mask (170).

Figure 9:
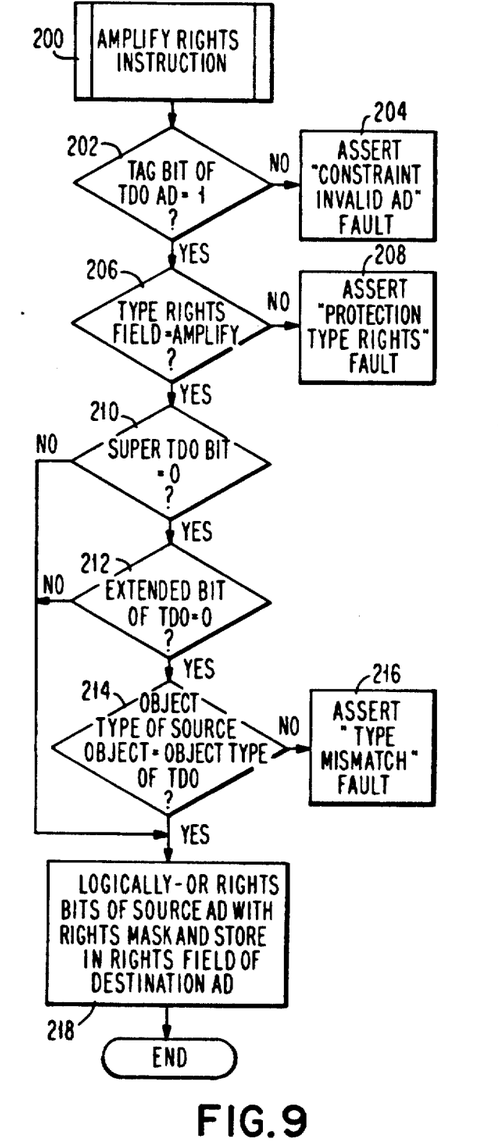
FIG. 9 is a diagram of data flow within the amplify rights logic of FIG. 8; and, FIG. 10 is a diagram of data flow within the restrict rights logic of FIG. 8.

The logic flow within the amplify rights logic (168) of FIG. 8 is shown in FIG. 9.

Figure 10:
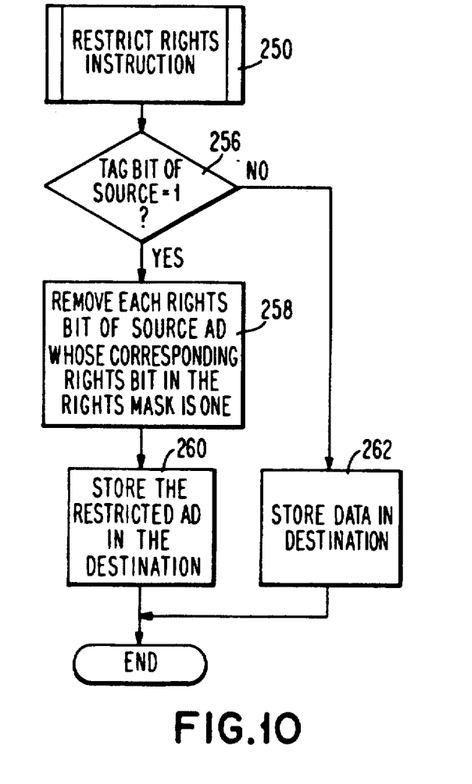

If the RESTRICT_RIGHTS instruction (167) is decoded, , access rights are reduced by logically-ANDing, in the restrict rights logic (172), the access rights in the AD with the complement of that in the rights mask (170). The logic flow within the restrict rights logic (172) of FIG. 8 is shown in FIG. 10.

The AMPLIFY_RIGHTS instruction requires a type definition object AD (51) with amplify rights. The AMPLIFY_RIGHTS instruction amplifies the rights of the source AD (162) as specified by the rights mask (170) and stores the amplified AD in the destination (176).

The RESTRICT_RIGHTS instruction removes the rights of the source AD (174) as specified by the rights mask (170) and stores the restricted AD in the destination (176).

The accessibility of an addressing environment can be restricted to those objects with the minimum required access rights needed for the execution of the program. Instructions are provided to remove (or restrict) access rights that are not needed. Access restriction is typically performed before an AD is passed as a parameter to a procedure or returned as a result.

Certain (system or extended) typed objects are manipulated exclusively by their corresponding type managers. An AD to a typed object, outside the domain of its type manager, usually has limited access rights (e.g. no access or read-only rights) to prevent access to or modification of the object without the knowledge of the type manager. The type manager restricts (i.e removes) the access rights in the ADs, for objects of the type(s) under its control, before passing them outside its domain. When such an AD is returned to the type manager, the access rights are amplified (i.e. increased) while inside the domain to allow modification, of the referenced object, by the type manager.

AMPLIFY_RIGHTS instruction

Refer to FIG. 9 which is a diagram of data flow within the amplify rights logic of FIG. 8 for an understanding of the following description of the AMPLIFY_RIGHTS instruction.

Operation: Amplifies, under control of a type definition object, the specified rights bits in the specified source AD and stores the amplified Ad in the destination. Opcodes: amplify

| 653 REG source_1(val:m) source_2(val:0) src/dst (vds:m) | |
|---|---|
| source_1 | type definition object |
| source_2 | rights_mask |
| src/dest | source/destination |

Action

Check the tag bit of the TDO AD (202). Raise a CONSTAINT_INVALID AD if the tag bit of the source AD is zero (204).

Check the type rights field to see if amplify rights are specified (206). If not, assert a PROTECTION TYPE RIGHTS fault (208).

Check the super TDO bit (210). If the super TDO bit in the TDO is one, go to logic block (218. If the super TDO bit in the TDO is zero and the extended bit is one (212), raise a TYPE.MISMATCH FAULT (216).

Compare the object type of the source object with the object type controlled by the TDO (214). If different, and the super TDO bit in the TDO is zero (21) and the extended bit is zero (212), then raise a TYPE.MISMATCH FAULT (216).

If the object type of the source object with the object type controlled by the TDO (214) are the same, then Logically OR the read, write and type bits of the source AD and the corresponding bits in the rights mask to form the type rights of the destination AD (218).

RESTRICT_RIGHTS instruction

Refer to FIG. 10 which is a diagram of data flow within the restrict rights logic of FIG. 8 for an understanding of the following description of the RESTRICT_RIGHTS instruction.

Operation: Restricts the specified rights bits in the specified source AD and stores the Restricted AD in the destination. Opcodes: restrict

| 652 REG source_2(val:0) src/dst (vds:m) | |
|---|---|
| source_2 | rights_mask |
| src/dest | source/destination |

Action

Check the type rights field to see if restrict rights are specified (252). If not, assert a PROTECTION TYPE RIGHTS fault (254).

If the tag bit of the source is zero (256) skip the following rights restriction actions and store the data segment in the destination (260).

If the tag bit of the source is one (256) remove the read, write and type bits of the source AD whose corresponding rights bits in the rights mask are one (260). Store the restricted AD in the destination (260).

Cacheable

The cacheable bit is defined to prevent "caching" of an object or a page. This bit is one if caching is allowed, zero otherwise. Caching allows delaying a memory access (e.g. write back), and grouping contiguous memory accesses into a single memory transaction (e.g. cache fill). If caching is disabled, memory accesses are passed directly to the physical memory without any modification.

In a system with memory mapped device registers, the cacheable bit for the page or object should be zero. It may also be used to prevent external caching of instruction region to avoid double caching, or to prevent caching of shared objects to avoid unnecessary caching traffic.

The cacheable bit in a simple object descriptor or a page table entry indicates whether the contents of the referenced object or page can be cached.

While the invention has been particularly shown and described with reference to preferred embodiments thereof, it will be understood by those skilled in the art that the foregoing and other changes in form and detail may be made therein without departing from the scope of the invention.

We claim:

1. A data processing system including a memory space (10) and a processor register space (11) in a processor of said data processing system, said processor register space including means for storing object descriptors having base and length information stored therein for use in locating objects in said memory space,
    means in said processor for communicating with said memory space (10);
    means in said processor for executing an operation by means of an operator specified in an instruction (14);
    a plurality of addressably objects, including a bipaged object (38), said plurality of addressable objects being stored in an address space of said memory space,
    said plurality of addressable objects including instruction objects comprised of instructions including said instruction (14) defining an operation;
    an address (20) referenced in said instruction, said address being specified as an offset (22) and an access descriptor (24);
said data processing system characterized by:
    said plurality of objects including an object table (42), a page table directory (60), and a page table (44);
    each of said objects being comprised of words, said words being either access descriptors or data words;
    each of said access descriptors including
    1. an object index for selecting an object in said address space, and
    2. a rights field, said rights field specifying the permissible operations on an object selected by said access descriptor;
    said object table object (42) being stored at an address accessible by said processor upon processor initialization,
    said object table having stored therein object descriptors for use by said processor in forming physical addresses to said page table directory object (60),
    each of said object descriptors including a first encoded field (50) specifying a base address of an object referenced by said object descriptor and a second encoded field (52) which includes an object entry type;
    said page table (44) having stored therein page table entries, one page table entry for use by said processor in forming physical addresses to a paged object (38),
    said page table directory (60) having stored therein page table directory entries, one page table directory entry for use by said processor in forming physical addresses to said page table (44);
    said one page table entry having a page rights field (81);
    said one page table directory entry having a page rights field (62);
    said offset (22) including a page index (PI) used to index into a selected page table to locate said one page table entry, and a page offset (PO) used in conjunction with a base address (79) stored in said page table entry to locate a datum entry in said paged object (38); and,
    means (168) for comparing said page rights field (81) of said page table entry and said page rights field (62) of said page table directory entry with a type field indicating a type of memory access and for asserting a fault provided that an access is inconsistent with the page rights field (62) of said page directory entry or the page rights field (50) of said page table entry
    one of said instruction objects being a rights amplification instruction;

said plurality of objects further including a type definition object (74);

said type definition object (TDO) including a TDO bit capable of being st to a first state and a second state;

means for setting said TDO bit in said type definition object to a first state or to a second state;

means for interpreting said TDO bit during execution of said rights amplification instruction such that when in said first state said TDO bit is used to amplify rights of access descriptors for objects whose type (object type or TDO) matches that type specified by said type definition object (TDO) and when in said second state said TDO bit is used to amplify rights of any access descriptor.

2. A method in a data processing system, said data processing system including a memory space (10) and a processor register space (11) in a processor of said data processing system, said processor register space including means for storing object descriptors having base and length information stored therein for use in locating objects in said memory space, said processor being capable of communicating with said memory space (10) and capable of executing an operation by means of an operator specified in an instruction (14);

a plurality of addressable objects, including a bipaged object (38), said objects being stored in an address space of said memory space, said plurality of addressable objects including instruction objects comprised of instructions including said instruction (14) defining an operation;

one of said instruction objects being a rights amplification instruction;

said plurality of objects further including a type definition object (74);

an address (20) referenced in said instruction, said address being specified as an offset (22) and an access descriptor (24);

said plurality of objects including an object table (42) having an object table entry type therein, a page table directory (60) having a page table directory entry therein, and a page table (44) having a page table entry therein;

each of said objects being comprised of words, said words being either access descriptors or data words;

each of said access descriptors including
1. an object index for selecting an object in said address space, and
2. a rights field, said rights field specifying permissible operations on an object selected by said access descriptor;

said object table (42) being stored at an address accessible by said processor upon processor initialization, said object table having stored therein object descriptors for use by said processor in forming physical addresses to said page table directory (60), each of said object descriptors including a first encoded field (50) specifying a base address of an object referenced by said object descriptor and a second encoded field (52) which includes an object entry type;

said page table (44) having stored therein page table entries for use by said processor in forming physical addresses to said bipaged object (38), each page table entry having a page rights field (81);

said offset (22) including a page index (PI) used to index into a selected page table to locate said page table entry, and a page offset (PO) used in conjunction with a base address (79) stored in said page table entry to locate a datum entry in said bipaged object (38); said method comprising the steps of:

A. comparing said page rights field (81) of said page table entry with said object table entry type; and, B. comparing said rights field of said page table directory entry with said object table entry type; and, C. asserting a fault if said page rights field (62) of said page directory entry or said page rights field (50) of said page table entry differ from said object table entry type;

D. setting a TDO bit in said type definition object to a first state or to a second state;

E. interpreting said TDO bit during execution of said rights amplification instruction such that when in said first state said TDO bit is used to amplify rights of access descriptors for objects whose type (object type or TDO) matches a type specified by said TDO; and, F. interpreting said TDO bit during execution of said rights amplification instruction such that when in said second state said TDO bit is used to amplify rights of any access descriptor.

3. The method in accordance with claim 2 wherein said plurality of objects further includes a type definition object (TDO), said TDO including a TDO object type, a super TDO bit and an extended bit, and wherein said object table includes an access descriptor (TDO AD) associated with said TDO and wherein one of said instruction objects is an AMPLIFY_RIGHTS instruction having a source_1 operand specifying said type definition object, including a source AD, a source_2 operand specifying a rights mask comprised of mask bits and a source/destination operand for receiving an amplified AD;

said method further comprising the steps of:

G. raising a CONSTAINT_INVALID AD if a tag bit of said source AD is zero;

H. performing type rights checking on said TDO AD;

I. checking said object type of said TDO AD upon the condition that said TDO associated with the object is not the same as the specified TDO, J. asserting a TYPE.MISMATCH FAULT upon the condition that said super TDO bit in said TDO is zero and said extended bit is zero and said object type of the source object is different from said object type of said TDO; and, K. logically ORing the read, write and type bits of said source AD and said mask bits in said rights mask to form a type rights field of said amplified AD in said destination operand; and, L. storing said amplified AD in said source/destination operand.

* * * * *